United States Patent
Takayama et al.

(10) Patent No.: US 7,956,287 B2
(45) Date of Patent: Jun. 7, 2011

(54) TRANSPARENT CONDUCTIVE FORMED ARTICLE FOR A TOUCH PANEL AND TOUCH PANEL

(75) Inventors: Ryuji Takayama, Osaka (JP); Hidemi Ito, Osaka (JP); Hitoshi Masago, Osaka (JP); Junichi Nakanishi, Osaka (JP)

(73) Assignee: Takiron Co., Ltd., Osaka (JP)

( * ) Notice: Subject to any disclaimer, the term of this patent is extended or adjusted under 35 U.S.C. 154(b) by 1097 days.

(21) Appl. No.: 11/587,157

(22) PCT Filed: Apr. 19, 2005

(86) PCT No.: PCT/JP2005/007456
§ 371 (c)(1),
(2), (4) Date: Nov. 15, 2006

(87) PCT Pub. No.: WO2005/104141
PCT Pub. Date: Nov. 3, 2005

(65) Prior Publication Data
US 2008/0029292 A1 Feb. 7, 2008

(30) Foreign Application Priority Data
Apr. 20, 2004 (JP) .................. P.2004-123725

(51) Int. Cl.
*H01R 4/02* (2006.01)
(52) U.S. Cl. .................. 174/94 R; 174/126.4
(58) Field of Classification Search .......... 174/94 R, 174/126.4
See application file for complete search history.

(56) References Cited

U.S. PATENT DOCUMENTS

| | | | | |
|---|---|---|---|---|
| 5,853,877 A * | 12/1998 | Shibuta | ............ | 428/357 |
| 6,066,448 A * | 5/2000 | Wohlstadter et al. | ............ | 435/6 |
| 2003/0122111 A1 * | 7/2003 | Glatkowski | ............ | 252/500 |
| 2003/0164477 A1 | 9/2003 | Zhou et al. | | |
| 2004/0265550 A1 * | 12/2004 | Glatkowski et al. | ............ | 428/209 |
| 2006/0257638 A1 * | 11/2006 | Glatkowski et al. | ............ | 428/292.1 |

FOREIGN PATENT DOCUMENTS
CN 1745302 A 3/2006
(Continued)

OTHER PUBLICATIONS

Chinese Office Action dated Dec. 26, 2008. Supplementary European Search Report dated Feb. 5, 2008.
Taiwanese Office Action and Search Report dated Aug. 18, 2010 in corresponding Taiwan Patent Application No. 094112537.

*Primary Examiner* — Chau N Nguyen
(74) *Attorney, Agent, or Firm* — Sughrue Mion, PLLC

(57) ABSTRACT

A touch panel-use transparent conductive molded product having a conductive layer excellent in wear resistance and flexing resistance, small in surface resistivity change when the touch panel is in use, and free from a change in transmitted light hue, and a touch panel using it. The touch panel-use transparent conductive molded product comprises a fine-conductive-fibers (4)-containing, transparent conductive layer (12) formed on at least one surface of a transparent substrate (11), and the touch panel uses the above transparent conductive molded product as an electrode. The fine conductive fibers in the transparent conductive layer (12) are dispersed without being aggregated, and touch each other while being dispersed with each of them separated from each other or each bundle of several fibers separated from each other. Therefore, it is possible to control a surface resistivity to $10^4\Omega/\square$ or smaller, and a conductive layer light beam transmittance at a wavelength of 550 nm to 75% or larger.

7 Claims, 3 Drawing Sheets

FOREIGN PATENT DOCUMENTS

| | | |
|---|---|---|
| EP | 1 561 765 A1 | 8/2005 |
| JP | 2003-80624 A | 3/2003 |
| JP | 2003-255104 * | 9/2003 |
| JP | 2003-320609 A | 11/2003 |
| JP | 2004-47456 A | 2/2004 |
| WO | WO 97/45257 A1 | 12/1997 |
| WO | WO 99/57703 A1 | 11/1999 |
| WO | 03/099709 A2 | 12/2003 |
| WO | 2004/052559 A2 | 6/2004 |

* cited by examiner

TRANSPARENT CONDUCTIVE FORMED ARTICLE FOR A TOUCH PANEL AND TOUCH PANEL

TECHNICAL FIELD

This invention relates to a transparent conductive formed article for a touch panel having a transparent conductive layer which shows high transparency, little coloring and excellent abrasion resistance and elasticity, and a touch panel using the same.

BACKGROUND OF THE INVENTION

In recent years, the demand of touch panels has been expanding as one of the devices to input data into an electronic pocketbook, a portable remote information terminal, a portable game machine, a car navigation system, a personal computer, a railway ticket dispenser and the like.

As the transparent conductive formed article for use in such touch panel, a transparent conductive film comprising a transparent conductive layer of an indium oxide-tin oxide (ITO) on one side of a polyethylene terephthalate film substrate is well known (Patent document 1, Patent document 2).

Patent document 1: JP-A-2-194943
Patent document 2: JP-A-11-203047

DISCLOSURE OF THE INVENTION

Problems to be Solved by the Invention

However, since the transparent conductive formed article prepared by forming a transparent conductive layer consisting of an indium oxide-tin oxide (ITO) on one side of a polyethylene terephthalate film substrate is inferior in elasticity because of the ceramic nature of the transparent conductive layer, so that it poses a problem in that cracks are generated in the transparent conductive layer when input is repeated, thus resulting in the abnormal detection due to a change in the surface resistivity, and therefore in the unaccurate input, and another problem in that, being inferior to abrasion resistance, their handling requires great care in various steps of the touch panel production processing.

Also, since the ITO transparent conductive layer absorb ITO-specific wave length of light and thereby changes hues of the transmitting light, there is a problem of causing a difficulty in accurately representing the displaying hue of a touch panel display device.

In addition, with the needs of recent years for high accuracy of the input and reduction of electric power consumption, the requirement for the surface resistivity has also been changed to a higher resistivity of approximately from $800\Omega/\square$ to several thousand $\Omega/\square$ than the conventional level, but in the case of the ITO transparent conductive formed articles, it is necessary to lessen (thin down) thickness of the ITO layer to about 10 nm in order to obtain the surface resistivity, and such a case cannot withstand its practical use because of not only the further reduction of elasticity and abrasion resistance but also the lack of reproducibility of surface resistivity.

In addition, since the transparent conductive formed article consisting of ITO is produced by a spattering process or the like batch type method, there also is a problem of less productivity and high cost.

The invention has been made to cope with the aforementioned problems, and its problem to be resolved is to provide transparent conductive formed articles for a touch panel, having a conductive layer in which change in the surface resistivity at the time of its use in a touch panel can be reduced because of the superior abrasion resistance and elasticity, so that its using life can be prolonged and hues of the transmitting light do not change, and a touch panel which uses the same.

In addition, its another problem to be resolved is to provide transparent conductive formed articles for a touch panel, having a low cost and economical transparent conductive layer, and a touch panel which uses the same.

Means for Solving the Problems

In order to achieve the aforementioned objects, the first transparent conductive formed article for a touch panel of the invention is characterized in that a transparent conductive layer comprising ultra fine conductive fibers is formed on at least one side of a transparent substrate.

Also, the second transparent conductive formed article for a touch panel of the invention is characterized in that a transparent conductive layer comprising ultra fine conductive fibers is formed on at least one side of a transparent substrate, wherein the aforementioned ultra fine conductive fibers are dispersed and contacted with one another without aggregation.

Also, the third transparent conductive formed article for a touch panel of the invention is characterized in that a transparent conductive layer comprising ultra fine conductive fibers is formed on at least one side of a transparent substrate, wherein the aforementioned ultra fine conductive fibers are dispersed and contacted with one another in a state of separated individual fibers, or a bundle formed by the gathering of two or more fibers is dispersed and contacted with one another in a state of separated individual bundle.

According to the invention, carbon fibers, particularly carbon nanotubes, are preferably used as the ultra fine conductive fibers, and it is desirable that they are dispersed and contacted with one another in a state of separated individual fibers, or that a bundle is formed by the gathering of two or more fibers and these bundles are dispersed and contacted with one another. In addition, it is desirable that surface resistivity of the conductive layer has a conductivity of $10^4 \Omega/\square$ or less, and it is also desirable that the light transmittance at a wavelength of 550 nm is 75% or more.

Also, it is desirable that the increasing of surface resistivity of this conductive layer is by a factor of 1.3 times or less after bending it at a radius of curvature of 3 mm. Further, regarding the transmission hues of the transparent conductive formed article of the invention, it is desirable that both of the transmission hues a* and b* in the L*a*b* color system established by JIS Z8729 are within the range of from −2.5 to 2.5.

In addition, the touch panel of the invention is characterized by the use of the aforementioned respective transparent conductive formed article as the electrode.

In this connection, the term "without aggregation" as used herein means that there is no aggregated mass of 0.5 μm or more in average diameter when the conductive layer is observed under an optical microscope. Also, the "contact" is a term which means both of a case in which the ultra fine conductive fibers are actually contacted with one another and a case in which the ultra fine conductive fibers are coming very close to one another having conductible minute spaces. In addition, the "conductive" is a term which means that the surface resistivity is $10^4 \Omega/\square$ or less when measured by JIS K 7194 (ASTM D 991).

Effect of the Invention

Since the conductive layer is formed by the extra fine conductive fibers in the case of the first transparent conductive formed article for a touch panel of the invention, the surface resistivity can be easily controlled to $10^4 \Omega/\square$ or less, and the light transmittance of the conductive layer at a wavelength of 550 nm to 75% or more, and the transmitting light hues are not changed unlike the case of ITO, so that the display hues of a touch panel display device can be accurately represented. Also, since it is excellent in elasticity and abrasion resistance, it can be made into a transparent conductive formed article for a touch panel having superior durability.

In addition, when the ultra fine conductive fiber is a carbon nanotube, said carbon nanotube is thin and long so that their mutual contact can ensured further properly and a surface resistivity of $10^4 \Omega/\square$ or less can be easily obtained.

In the case of the second transparent conductive formed article for a touch panel of the invention, the ultra fine conductive fibers contained in the conductive layer are dispersed and contacted with one another without aggregation, so that the ultra fine conductive fibers are loosened corresponding to the un-aggregated portion of said fibers and their sufficient mutual conduct can be ensured. Thus, even when the amount of the ultra fine conductive fibers is reduced, the conductivity identical to the conventional level can be ensured, and the transparency can be improved in response to the reduced amount of the ultra fine conductive fibers. Accordingly, even when the amount of the ultra fine conductive fiber is reduced, the surface resistivity of the conductive layer can be set to $10^4 \Omega/\square$ or less, and the light transmittance of the same at a wavelength of 550 nm to 75% or more, and a transparent conductive formed article for a touch panel having superior hues and transparency can be obtained.

In the case of the third transparent conductive formed article for a touch panel of the invention, the ultra fine conductive fibers contained in the conductive layer are dispersed and contacted with one another in a state of separated individual fibers or a bundle formed by the gathering of two or more fibers is dispersed and contacted with one another in a state of separated individual bundle, so that the chance of contacting one fiber or one bundle of the ultra fine conductive fibers with other counterparts becomes frequent, and sufficient continuity can be ensured therefore proper conductivity and transparency can be obtained. Accordingly, even when the amount of the ultra fine conductive fiber is reduced, it becomes easy to obtain a formed article having a conductive layer surface resistivity of $10^4 \Omega/\square$ or less and a 550 nm wavelength light transmittance of 75% or more.

DESCRIPTION OF THE REFERENCE NUMERALS AND SIGNS

Figure 1:
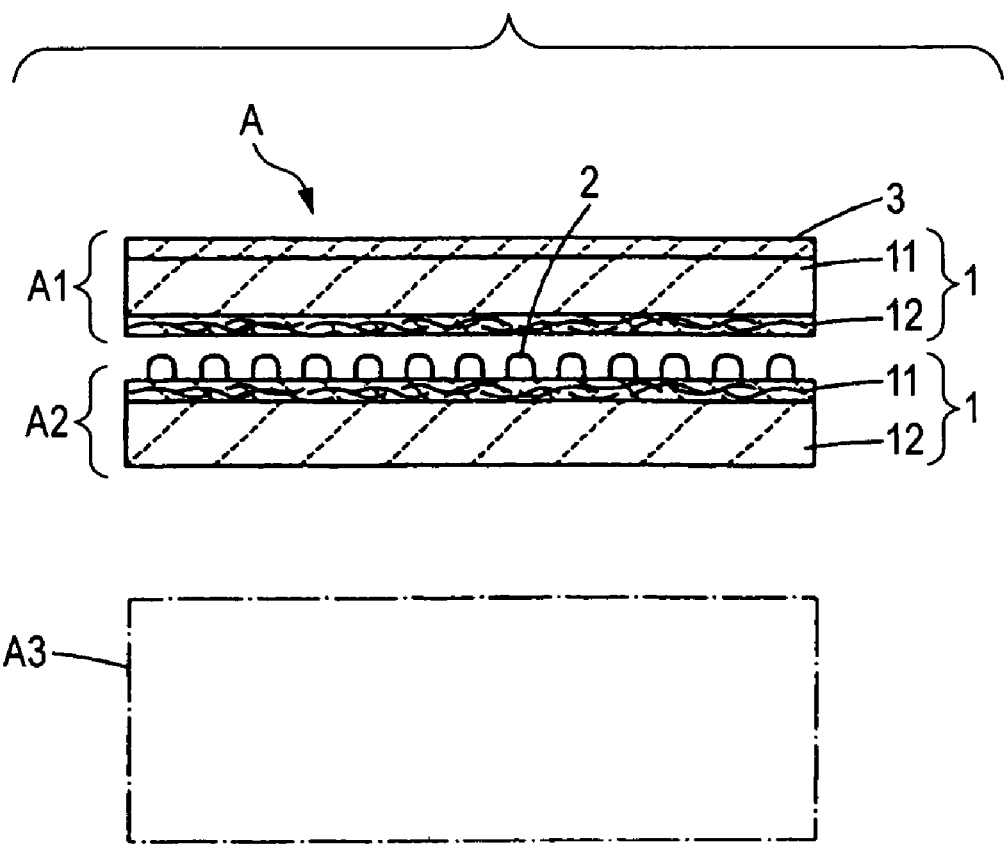
FIG. 1 is a side elevation view of a resistive film type touch panel which uses the transparent conductive formed article for a touch panel of the invention having a transparent conductive layer.

1 Transparent conductive formed article for a touch panel
11 Transparent substrate
12 Transparent conductive layer
2 Dot spacer
3 Function layer
4 Ultra fine conductive fibers
A Resistive film type touch panel

BEST MODE FOR CARRYING OUT THE INVENTION

The following describes typical embodiments of the invention in detail with reference to the drawings, but the invention is not limited thereto.

The resistive film type touch panel A exemplified in FIG. 1 comprises an upper electrode A1 and a lower electrode A2, and a liquid crystal or the like display device A3 is set on the lower side of this touch panel A. The upper electrode A1 comprises the transparent conductive formed article 1 of the invention for a touch panel in which a transparent conductive layer 12 is formed one side (lower side) of a transparent substrate 11 comprises a synthetic resin or the like, and a function layer 3 such as a hard coat layer for surface protection or a glare-proof layer for easy viewing of the image plane is formed on the opposite side (upper side) of the transparent substrate 11. In addition, the lower electrode A2 comprises the transparent conductive formed article 1 of the invention for a touch panel in which a transparent conductive layer 12 is formed on one side (upper side) of the transparent substrate 11 comprising glass, a synthetic resin or the like, and a dot spacer 2 is formed on the transparent conductive layer 12. The upper electrode A1 and the lower electrode A2 are set above and below of these transparent conductive layers 12 and 12 in such a manner that they are facing with each other having a gap, and when display surface of the upper electrode A1 is pushed with a pen or the like, a part of the upper electrode A1 and a part of the lower electrode A2 facing with each other interposing the dot spacer 2 are contacted with each other to effect their continuity and thereby input of a signal.

Figure 2:
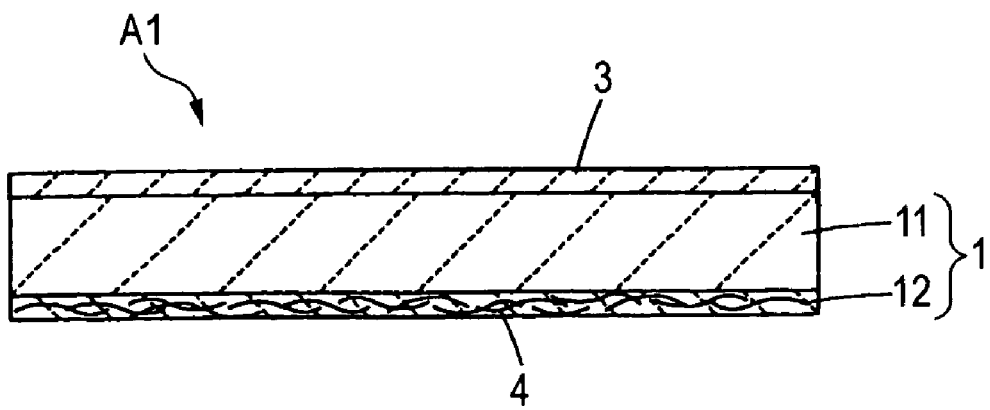
FIG. 2 is a sectional view showing an embodiment of the transparent conductive formed article of the invention to be used in the same touch panel.

As shown by expanding in FIG. 2, the transparent conductive formed article 1 for a touch panel to be used in this resistive film type touch panel A is formed by laminating the transparent conductive layer 12 which contains ultra fine conductive fibers 4 on the surface of one side of the synthetic resin, glass or the like transparent substrate 11.

In this connection, the transparent conductive layer 12 may form by laminating on both sides of the transparent substrate 11.

As described in the above, a thermoplastic resin having transparency, a curing resin which is cured by heat, ultraviolet rays, electron beam, radial rays or the like and has transparency, or glass or the like is used in the transparent substrate 11 which constitutes the transparent conductive formed article 1.

As the aforementioned transparent thermoplastic resin, for example, polyethylene, polypropylene, polycycloolefin or the like olefin resin, polyvinyl chloride, polymethyl methacrylate, polystyrene or the like vinyl resin, nitrocellulose, triacetyl cellulose or the like cellulose resin, polycarbonate, polyethylene terephthalate, polycyclohexane dimethylene terephthalate, polyethylene naphthalate, polyallylate, aromatic polyester or the like ester resin, ABS resin, polyether sulfone, polyether ether ketone, copolymer resin of these resins, mixed resin of these resins and the like are used, and as the aforementioned transparent curing resin, for example, epoxy resin, polyimide resin, acrylic resin and the like are used.

As the aforementioned resin, a resin which has a total light transmittance of 75% or more and a haze of 4% or less as the substrate 11 is used, particularly from which a transparent substrate 11 having a total light transmittance of 80% or more, preferably 85% or more, and a haze of 4% or less is particularly preferably used. As such a resin, polycycloolefin, polyvinyl chloride, polymethyl methacrylate, polystyrene, triacetyl cellulose, polycarbonate, polyethylene terephthalate, polycyclohexane dimethylene terephthalate, or a copolymer resin thereof, a mixed resin thereof or a curing type acrylic resin is used. In addition to them, glass is also used desirably because of its markedly excellent transparency of 95% or more as the total light transmittance.

In this connection, the aforementioned transparent substrate 11 made of a synthetic resin is optionally blended with a plasticizer, a stabilizer, an ultraviolet absorber and the like agents to improve its moldability, heat stability, weatherability and the like.

Among these resins and glass, it is desirable as the substrate to be used in the upper electrode A1, to have flexibility for the purpose of repeating input by pressing said upper electrode A1, and among the aforementioned materials, it is desirable to use a thermoplastic resin, particularly polyethylene terephthalate, polycarbonate, polycycloolefin, triacetyl cellulose or polymethyl methacrylate. In addition to this, it is desirable to provide more flexibility by setting its thickness to a level of from 5 μm to 1 mm, preferably from 25 to 500 μm.

On the other hand, it is desirable that the lower electrode A2 is possessed of rigidity because of its necessity to exert an action as a supporting material in repeating input by pressing the upper electrode A1, and any material of the aforementioned glass, thermoplastic resin and curing resin can be used, but it is desirable that its thickness is approximately from 500 μm to 3 mm. As a particularly desirable material, glass, polycarbonate, polycycloolefin, triacetyl cellulose, polymethyl methacrylate or the like is used.

Figure 3:
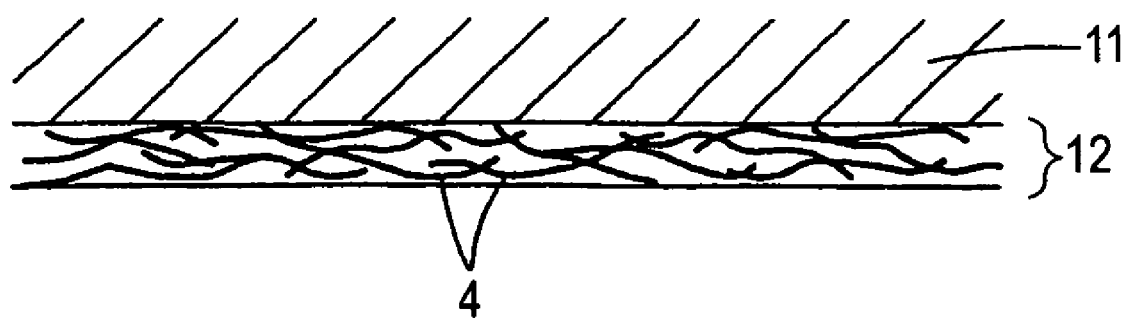
FIG. 3(A) (B) is a schematic sectional view showing dispersing state of the ultra fine conductive fibers in the conductive layer of the same transparent conductive formed article.
Figure 3:
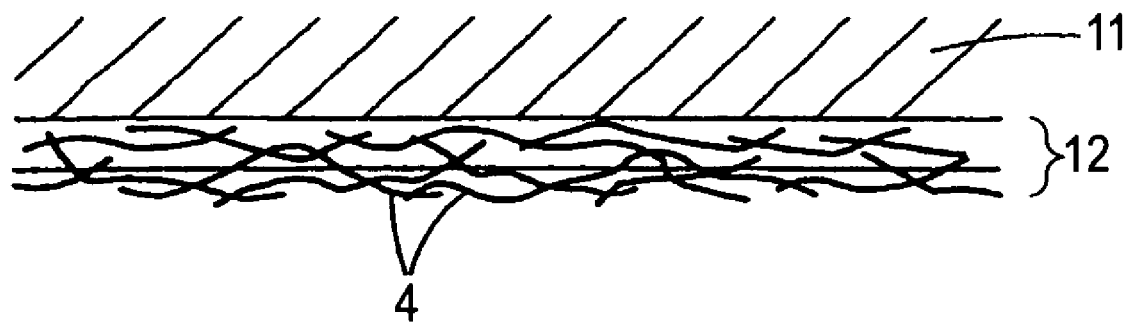

The conductive layer 12 formed on one side of this transparent substrate 11 is a transparent layer which contains the ultra fine conductive fibers 4, prepared in such a manner that its surface resistivity becomes $10^4$ Ω/□ or less, and its light transmittance at a wavelength of 550 nm becomes 75% or more. To effect this, it is desirable that the aforementioned ultra fine conductive fibers 4 are dispersed and contacted with one another without aggregation. In other words, the ultra fine conductive fibers 4 are dispersed and contacted with one another, in a state of separated individual fibers without entanglement or in a state under which a bundle formed by the gathering of two or more fibers is separated from other bundles. When the conductive layer 12 is formed mainly from the ultra fine conductive fibers 4 and a transparent binder, the ultra fine conductive fibers 4 are dispersed and contacted with one another inside the binder under the aforementioned dispersed state as shown in the (A) of FIG. 3, or the ultra fine conductive fibers 4 are dispersed and contacted with one another, wherein a part thereof are penetrated into the binder and the other part are protruded or exposed from the binder surface, under the aforementioned dispersed state as shown in the (B) of FIG. 3, or a part of the ultra fine conductive fibers 4 are dispersed inside of the binder as shown in the (A) of FIG. 3 and other ultra fine conductive fibers 4 are dispersed under such a state that they are protruded or exposed from the surface as shown in the (B) of FIG. 3.

Figure 4:
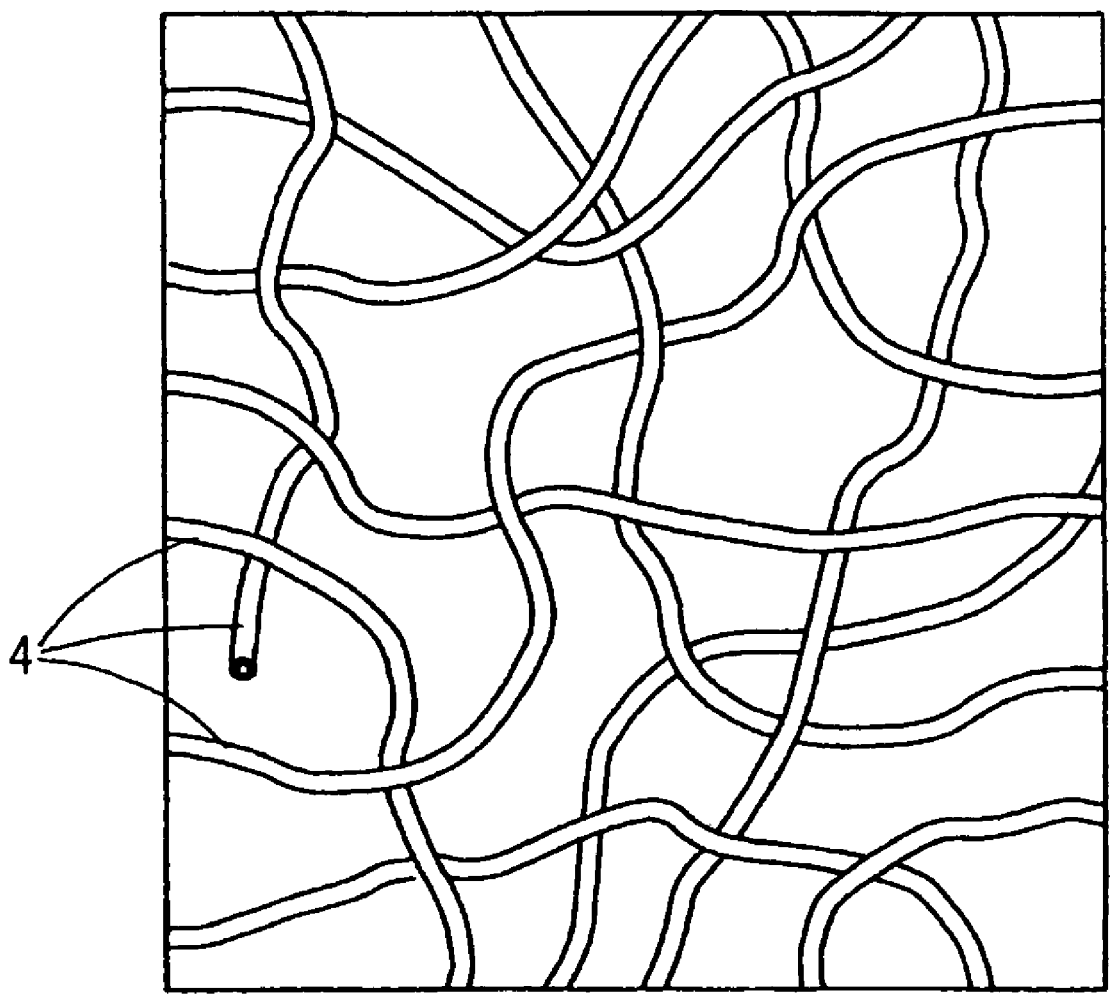
FIG. 4 is a schematic sectional view showing dispersing state of the ultra fine conductive fibers when the same conductive layer is viewed from a plane.

A dispersed state of these ultra fine conductive fibers 4 viewed from a plane is schematically and illustratively shown in FIG. 4. As can be understood from this FIG. 4, though a little bended, the ultra fine conductive fibers 4 are separated into respective fibers or bundles, dispersed in the conductive layer 12 or on the surface thereof in a simply crossed state without mutual entanglement, namely without aggregation, and contacted with one another at respective points of intersection.

When dispersed in this manner, the ultra fine conductive fibers 4 are loosened and distributed in a wide circle in comparison with the case of aggregated state, so that the chance of causing mutual contact of these fibers is considerably increased and as a result, the conductivity can be significantly improved effected by their continuity. In order to obtain a conductivity of about $10^3$ Ω/□ similar to the value described in a patent reference (JP-A-2000-26760) which used conventional carbon nanotubes, it can be effected by adjusting the point of contact (density of continuity) to the conventional level, so that the same contacting chance can be obtained even when the amount of the ultra fine conductive fibers 4 is reduced by effecting the aforementioned dispersed state, and corresponding amount of the ultra fine conductive fibers 4 can therefore be reduced. As a result, transparency is improved in response of the reduced amount of the ultra fine conductive fibers 4 which inhibit transparency, and since the conductive layer 12 can also be thinned, the transparency can be further improved.

In this connection, the ultra fine conductive fibers 4 are not necessarily separated and dispersed completely one fiber by one fiber or one bundle by one bundle, so that a partly entangled small aggregation mass may be present, but it is desirable that its size is not 0.5 μm or more in average diameter.

On the other hand, when the ultra fine conductive fibers 4 are contained in the conductive layer 12, in an amount similar to the conventional case, contacting chance of the fibers with one another can be increased to a level larger than the conventional case by effecting the aforementioned dispersed state. Thus, the conductivity can be markedly improved so that a conductivity of $10^4$ Ω/□ or less can be easily obtained.

In addition, when thickness of the conductive layer 12 is thinned to a level of from 5 to 500 nm by containing the ultra fine conductive fibers 4 in said conductive layer 12, the ultra fine conductive fibers 4 dispersing in the thickness direction can be concentrated and their chance of contacting with one another is increased, so that it becomes possible to further increase the conductivity. Accordingly, it is desirable to thin thickness of the conductive layer 12 within the aforementioned range, and it is more desirable to adjust it to a level of from 10 to 400 nm.

Thus, when the ultra fine conductive fibers 4 are separated into respective fibers or bundles in the conductive layer 12, though a little bended, and contacted with one another in a dispersed state without mutual and complex entanglement, namely without aggregation, the ultra fine conductive fibers 4 are hardly elongated to cause breakage or slipping even when said conductive layer 12 is twisted. Accordingly, a crack or exfoliation is not generated in said conductive layer 12 by the pressure of pen input or the like, therefore it does not cause increase of the surface resistivity and generation of breakage, so that it becomes a transparent conductive formed article 1 for a touch panel excellent in reliability and durability. As can be understood from the Examples which are described later, it was confirmed that the surface resistivity of the transparent conductive formed article 1 of the invention for a touch panel is increased merely 1.3 times or less of the original formed article when bent at a radius of curvature of 3 mm, and is increased only 1.4 times or less even when bent at a radius of curvature of 1 mm.

As the ultra fine conductive fibers 4 to be used in the conductive layer 12, ultra fine conductive fibers having a diameter of from 0.3 to 100 nm and a length of from 0.1 to 20

µm, preferably a length of from 0.1 to 10 µm, such as carbon nanotube, carbon nanohorn, carbon nanowire, carbon nanofiber, graphite fibril and the like ultra fine conductive fibers, metal nanotube, nanowire and the like ultra fine conductive fibers of platinum, gold, silver, nickel, silicon and the like and metal oxide nanotube, nanowire and the like ultra fine conductive fibers of zinc oxide and the like, are preferably used. Since these ultra fine conductive fibers 4 are dispersed in the state of one fiber by one fiber or one bundle by one bundle without aggregation, those in which the surface resistivity of said conductive layer 12 is $10^4 \Omega/\square$ or less and its light transmittance at a wavelength of 550 nm is 75% or more are obtained.

Among these ultra fine conductive fibers 4, carbon nanotubes are particularly desirable in obtaining a more transparent conductive layer 12, because said carbon nanotubes have such a considerably small diameter of from 0.3 to 80 nm that their action to inhibit light transmission becomes less when they are dispersed in one fiber by one fiber or one bundle by one bundle.

These ultra fine conductive fibers 4 ensure their continuity by dispersing and contacting with one another inside of the conductive layer 12 or on the surface thereof without aggregation, as a separated fiber or as a bundle formed by the gathering of two or more fibers. Accordingly, by containing the ultra fine conductive fibers 4 in the conductive layer 12 at the estimated content of from 1 to 450 mg/m$^2$, the surface resistivity can be freely controlled at $10^4 \Omega/\square$ or less, particularly within the range of from $10^0$ to $10^4 \Omega/\square$. Said estimated content is a value calculated by observing the surface of the conductive layer 12 under an electron microscope and thereby measuring area ratio of the ultra fine conductive fibers 4 occupying the surface area, and by multiplying this by the thickness and specific gravity of the ultra fine conductive fibers 4 (when the ultra fine conductive fibers are carbon nanotubes, average value 2.2 of the reference values 2.1 to 2.3 of graphite is adopted).

In this connection, the without aggregation is a term which means that, as described in the foregoing, when aggregated masses are found by the observation of the conductive layer 12 under an optical microscope, and their length and breadth are measured, there is no mass having its average value of 0.5 µm or more.

Included in the aforementioned carbon nanotubes are multi-wall carbon nanotubes in which circumference of the central axis line is concentrically equipped with two or more of cylindrically closed carbon walls having different diameters, and single-wall carbon nanotubes in which circumference of the central axis line is equipped with a cylindrically closed single carbon wall.

Included in the former multi-wall carbon nanotubes are those in which they are constituted by overlapping in multiple layers around the central axis line and those in which they are formed into spiral multiple layers. Particularly preferred among these multi-wall carbon nanotubes are those in which 2 to 30 layers, more preferably 2 to 15 layers are overlapped. Said multi-wall carbon nanotubes are dispersed in a individually separated state in most cases, but in the case of carbon nanotubes of 2 to 3 walls, they are dispersed by forming bundles in some cases.

On the other hand, the latter single-wall carbon nanotubes are a tube of single layer cylindrically closed around the central axis line. Such single-wall carbon nanotubes is present generally in the form of a bundle of two or more tubes, and the resulting bundles are separated from one another and dispersed in the conductive layer or on the surface thereof in a simply crossed state without complex entanglement of the bundles, or without aggregation, but under a simply crossed state, and they are contacted with one another at respective points of intersection. Preferably, those in which 10 to 50 single-wall carbon nanotubes are gathered to form a bundle are used. In this connection, a case in which they are dispersed under an individually separated state is also included in the invention as a matter of course.

As described in the foregoing, when the ultra fine conductive fibers 4 are dispersed in the conductive layer 12 without their entanglement or aggregation and contacted with one another, sufficient continuity among carbon nanotubes is ensured even when thickness of the conductive layer 12 is thinned, so that even when the estimated content of the ultra fine conductive fibers 4 is set to a level of from 1 to 450 mg/m$^2$ and thickness of the conductive layer 12 is thinned to a level of from 5 to 500 nm, the carbon nanotubes are loosened such that sufficient mutual continuity is ensured, the surface resistivity can be easily set to $10^4 \Omega/\square$ or less, and excellent conductivity can be exerted. In addition, since the ultra fine conductive fibers 4 do not inhibit light transmission effected by their loosening and subsequent disappearance of aggregated masses, the transparency becomes excellent, and what is more, the transparency is further improved in response to the reduced estimated content of the carbon nanotubes by thinning thickness of the conductive layer 12.

In order to achieve more superior conductivity and transparency by containing the ultra fine conductive fibers 4 in a large amount in the conductive layer 12; it is important to form a thin conductive layer by increasing dispersibility of the ultra fine conductive fibers 4 and further improving leveling property of the prepared coating fluid by reducing viscosity of the coating fluid, and in order to do this, it is important to jointly use a dispersing agent. As such a dispersing agent, an alkyl ammonium salt solution of an acidic polymer, a high polymer type dispersing agent such as a tertiary amine-modified acrylic copolymer, a polyoxyethylene-polyoxypropylene copolymer or the like, a coupling agent or the like is suitably used.

As the binder to be used in the conductive layer 12, a transparent thermoplastic resin, particularly polyvinyl chloride, vinyl chloride-vinyl acetate copolymer, polymethyl methacrylate, nitrocellulose, chlorinated polyethylene, chlorinated polypropylene or a fluorocarbon resin such as vinylidene fluoride, or a transparent curing resin which is cured by heat, ultraviolet rays, electron beam, radial rays or the like, particularly melamine acrylate, urethane acrylate, epoxy resin, polyimide resin, or a silicone resin such as acryl-modified silicate, is used, and the conductive layer consisting of these binders and the aforementioned ultra fine conductive fibers 4 is prepared in such a manner that it becomes a transparent layer. In this connection, an inorganic material such as colloidal silica may be added to these binders. When the substrate 11 is formed by a transparent thermoplastic resin, the same types of transparent thermoplastic resin or a different types of transparent thermoplastic resin having compatibility therewith is suitably used because of the superior mutual laminating property.

In addition, when a curing resin or a colloidal silica-containing binder is used as the binder, a transparent conductive formed article 1 for a touch panel having excellent scratch resistance, abrasion resistance and the like can be obtained, so that not only it becomes possible to prepare a formed article which has less chance of generating scratches due to a pen input and the like, does not cause increase of surface resistivity and has high durability, but also the handling at the time of touch panel production processing becomes easy, too.

Though such a binder is not always necessary for the conductive layer 12, but is desirably used in keeping the surface resistivity.

As described in the foregoing, when the ultra fine conductive fibers 4 are dispersed one fiber by one fiber or one bundle by one bundle without aggregation, by setting the estimated content of the ultra fine conductive fibers 4 in the conductive layer 12 to a level of from 1 to 450 mg/m$^2$ and by thinning thickness of the conductive layer 12 to a level of from 5 to 500 nm, a good conductivity of $10^4 \Omega/\square$ or less as the surface resistivity and a transparency of 75% or more as the light transmittance at a wavelength of 550 nm are achieved. More preferably, the estimated content of the ultra fine conductive fibers 4 is from 3 to 400 mg/m$^2$ and the thickness of the conductive layer 12 is from 10 to 400 nm.

In this connection, weatherability and other physical properties may be improved by optionally adding an ultraviolet absorber, a surface treatment agent, a stabilizer and the like additive agents to this conductive layer 12. Also, in addition to the carbon nanotubes, powder of a conductive metal oxide may be contained therein in an amount of approximately from 30 to 50% by mass.

Since the ultra fine conductive fibers 4 seldom exert influence upon hues by dispersing in the aforementioned manner, the aforementioned conductive layer 12 can be made into a roughly colorless and transparent form which is unbiased toward yellowish, bluish and the like. Because of this, as can be understood from the Examples which are described later, the transparent conductive formed article 1 prepared by forming the aforementioned conductive layer 12 on one side of the aforementioned transparent substrate 11 keeps a roughly colorless and transparent form which is unbiased toward yellowish, bluish and the like, because both of the transmission hues a* and b* in the L*a*b* color system established by JIS Z8729 become within the range of from −2.5 to 2.5.

Accordingly, the display hues displayed by the display device A3 set on the lower side of the lower electrode A2 are not changed, so that the display hues of the touch panel display device A3 can be accurately displayed. In addition, the yellow index (YI) of the transparent conductive formed article 1 based on JIS K7103 also becomes 4.5 or less, so that it becomes a yelloless formed article. Preferably, a formed article 1 which simultaneously satisfies an a* value of from −1 to 1, a b* value of from −2.5 to 2.5 and a YI value of 4.5 or less is desirable. In this connection, the L*, a* and b* are measured based on JIS Z8722.

In addition, as shown in FIG. 1, when the function layer 3 consisting of a hard coat layer is formed on the outer surface, a scratch and the like can be prevented by said function layer, and transparency of the upper electrode A1 can be maintained even when the touch panel A is pressed with a finger, so that this is suitably used. In this connection, it is not always necessary to form this function layer 3.

Such a transparent conductive formed article for a touch panel can be efficiently mass-produced for example by the following methods. The first method is a method for producing the transparent conductive formed article 1 for a touch panel, in which a coating fluid is prepared by uniformly dispersing the ultra fine conductive fibers 4 in a solution prepared by dissolving the aforementioned binder for conductive layer forming use in a volatile solvent, and this coating fluid is coated to one side of the substrate 11 and solidified, thereby to form the conductive layer 12.

The second method is a method for producing the transparent conductive formed article 1 for a touch panel, in which a conductive film is prepared by forming the conductive layer 12 on one side of a thermoplastic resin film identical to the substrate 11 or a different types of thermoplastic resin film having compatibility therewith, by coating and solidifying the aforementioned coating fluid thereon, and this conductive film is put upon one side of the substrate 11 and subjected to thermo-compression bonding with a hot press or roll press.

The other method is a method for producing the transparent conductive formed article 1 for a touch panel, in which a transfer film is formed by preparing the conductive layer 12 by coating and solidifying the aforementioned coating fluid on a release film such as polyethylene terephthalate, and as occasion needs by further forming an adhesion layer, and this transfer film is put upon one side of the substrate 11 and subjected to compression bonding to transfer the conductive layer 12 or the adhesion layer and the conductive layer 12.

In this connection, it goes without saying that this can also be produced by other conventionally known methods.

Since the transparent conductive formed article 1 obtained in this manner shows a surface resistivity of $10^4 \Omega/\square$ or less, it has a sufficient surface resistivity as the electrode for a touch panel, and since the light transmittance of the conductive layer 12 at a wavelength of 550 nm is 75% or more, the total light transmittance of the transparent conductive formed article 1 is 70% or more, the haze is 4% or less and both of the transmission hues a* and b* of the same formed article 1 in the L*a*b* color system are within the range of from −2.5 to 2.5, the display hues of the touch panel display device can be accurately displayed without changing hues of the transmitting light.

In the aforementioned embodiment, the transparent conductive formed article 1 of the invention was used in both of the upper electrode A1 and the lower electrode A2, but it is possible also to use the formed article of the invention in the upper electrode A1 and to use a formed article in which a transparent conductive layer consisting of ITO was formed (e.g., glass equipped with an ITO conductive layer) in the lower electrode A2, or to use a formed article in which a transparent conductive layer consisting of ITO was formed (e.g., a film equipped with an ITO conductive layer) in the upper electrode A1 and to use the formed article of the invention in the lower electrode A2. In addition, the transparent conductive formed article of the invention can be used as the lower electrode A2, by mounting it on glass or a support member made of a plastics.

Next, more illustrative examples of the invention are described in the following.

EXAMPLE 1

Single-wall carbon nanotubes (diameter 1.3 to 1.8 nm, synthesized based on a reference Chemical Physics Letters, 323 (2000) pp. 580-585) and a polyoxyethylene-polyoxypropylene copolymer as a dispersing agent were added to an isopropyl alcohol/water mixture (mixing ratio 3:1) as a solvent and uniformly mixed and dispersed, thereby preparing a coating fluid containing 0.003% by mass of the single-wall carbon nanotubes and 0.05% by mass of the dispersing agent.

A conductive layer was formed by coating this coating fluid to the surface of a commercially available polyethylene terephthalate film having a thickness of 100 μm (total light transmittance 94.5%, haze 1.5%) and drying, and then by coating and drying a thermosetting urethane acrylate solution diluted to 1/600 with methyl isobutyl ketone, thereby obtaining a conductive transparent polyethylene terephthalate film.

When surface resistivity of this conductive transparent polyethylene terephthalate film was measured using Rolestar EP manufactured by Mitsubishi Chemical Corporation, the surface resistivity was about $3.63 \times 10^2 \Omega/\square$, as shown in Table 1.

Also, when total light transmittance and haze of this conductive film were measured in accordance with ASTM D1003 using a direct reading haze computer HGM-2DP manufactured by SUGA TEST INSTRUMENTS CO., LTD., the total light transmittance was 82.0%, and the haze was 2.5%, as shown in Table 1.

In addition, regarding the light transmittance of the conductive layer of this conductive film at a wavelength of 550 nm, a difference in the light transmittance at a wavelength of 550 nm between the conductive film and the original polyethylene terephthalate film was measured using self recording spectrophotometer UV-3100PC manufactured by SHIMADZU CORPORATION and used as the light transmittance of the conductive layer. As shown in Table 1, this light transmittance was 87.2%.

Further, when the estimated content of single-wall carbon nanotubes in the conductive layer of this conductive film was measured, it was 94 mg/m².

Further, when the conductive layer of this conductive film was observed under an optical microscope, an aggregated mass of 0.5μ or more was not present, dispersion of the single-wall carbon nanotubes was sufficiently carried out. In addition, it was found that a large number of carbon nanotubes were uniformly dispersed, under a state of separating one bundle by one bundle, and contacted with one another under a simply crossed state.

Further, in order to examine hues of this conductive film, transmission hues of the conductive film were measured using a color-difference meter ZE-2000 manufactured by NIPPON DENSHOKU INDUSTRIES CO., LTD. based on JIS Z8722. As shown in Table 1, this conductive film was L*: 90.48, a*: −0.29, b*: 2.14 and YI: 4.30.

Further, in order to examine a change in the surface resistivity when this conductive film was bent, the film was bent along a wire or cylinder having a predetermined radium and kept for 1 minute, and then the surface resistivity including the bent part was measured. The increasing ratio of surface resistivity when the surface resistivity before the bending was defined as 1 (100%) is described in Table 1.

EXAMPLE 2

A conductive layer was formed by applying and drying the coating fluid used in Inventive Example 1 on the surface of the polyethylene terephthalate film used in Inventive Example 1, thereby obtaining a conductive transparent polyethylene terephthalate film wherein the estimated content of the carbon nanotube in said conductive layer was 50 mg/m².

When surface resistivity of this conductive transparent polyethylene terephthalate film was measured in the same manner as in Inventive Example 1, the surface resistivity was $9.55 \times 10^2 \Omega/\square$ as also shown in Table 1.

Also, when total light transmittance and haze of this conductive film were measured in the same manner as in Inventive Example 1, the total light transmittance was 87.9%, and the haze was 2.5% as also shown in Table 1.

In addition, when the light transmittance of the conductive layer of this conductive film at a wavelength of 550 nm was measured in the same manner as in Inventive Example 1, it was 93.0% as also shown in Table 1.

EXAMPLE 3

A conductive layer was formed by applying and drying the coating fluid used in Inventive Example 1 on the surface of the polyethylene terephthalate film used in Inventive Example 1, thereby obtaining a conductive transparent polyethylene terephthalate film wherein the estimated content of the carbon nanotube in said conductive layer was 47 mg/m².

When surface resistivity of this conductive transparent polyethylene terephthalate film was measured in the same manner as in Inventive Example 1, the surface resistivity was $13.96 \times 10^2 \Omega/\square$ as also shown in Table 1.

Also, when total light transmittance and haze of this conductive film were measured in the same manner as in Inventive Example 1, the total light transmittance was 90.1% and the haze was 2.0% as also shown in Table 1.

Also, when the light transmittance of the conductive layer of this conductive film at a wavelength of 550 nm was measured in the same manner as in Inventive Example 1, it was 95.6% as also shown in Table 1.

In addition, when an abrasion head (covered by Kanakin No. 3 cotton cloth) was rubbed 250 reciprocations (500 times) at 500 g/cm² using a Gakushin type dyed goods abrasion fastness tester NR-100 (mfd. by DAIEI KAGAKU SEIKI MFG. CO., LTD.) designed based on JIS L0849, and then surface resistivity of the abrasion resistance face was measured, it was $7.6 \times 10^3 \Omega/\square$ as also shown in Table 1.

COMPARATIVE EXAMPLE 1

Using a commercially available ITO film "Transparent Conductive Film 400R" manufactured by Toyobo Co., Ltd., surface resistivity, total light transmittance and haze, hues, change in surface resistivity when bent and surface resistivity after abrasion resistance test were measured in the same manner as in Inventive Example 1, with the results also shown in Table 1.

TABLE 1

|  |  | Ex. 1 | Ex. 2 | Ex. 3 | Comp. Ex. 1 |
|---|---|---|---|---|---|
| The estimated content | mg/m² | 94 | 50 | 47 | — |
| Surface resistivity | Ω/□ | 363 | 955 | 1396 | 454 |
| Total light transmittance | % | 82.0 | 87.9 | 90.1 | 88.8 |
| Haze | % | 2.5 | 2.5 | 2.0 | 1.4 |
| Light transmittance | % | 87.2 | 93.0 | 95.6 | — |
| Hues  L* | — | 90.48 | — | — | 91.6 |
| a* | — | −0.29 | — | — | −0.32 |
| b* | — | 2.14 | — | — | 2.82 |
| YI | — | 4.30 | — | — | 5.57 |
| (*)  Radius: 10 mm | -fold | 1.02 | 1.09 | — | 1.02 |
| Radius: 5 mm | -fold | 1.02 | 1.03 | — | 1.01 |
| Radius: 3 mm | -fold | 1.19 | 1.11 | — | 3.10 |
| Radius: 1 mm | -fold | 1.23 | 1.08 | — | 2749.43 |
| Surface resistivity after abrasion resistance test | Ω/□ | — | — | 7610 | 13870 |

*Increase in surface resistivity after bending

Since Examples 1 to 3 have a surface resistivity of from 363 to 1396Ω/□, which is similar to the resistivity of the ITO film of Comparative Example 1 as can be seen from Table 1, it is evident that they have the surface resistivity necessary as the electrode for a touch panel. What is more, since the surface resistivity after abrasion resistance test was 7610Ω/□ which is only about 5-fold increase in comparison with that before the test, it was found that the product keeps the necessary surface resistivity and shows the function as the electrode for a touch panel even when pressure is repeatedly applied to the transparent conductive layer by pen input or the like. Contrary to this, since that of the ITO film of Comparative Example 1 was 13870Ω/□, which is about 30 times of increase in comparison with that of before the test, it is considered that the function as the electrode for a touch panel is lost when pen input or the like pressure is continued.

In addition, the hues of Example 1 are −0.29 as a* and 2.14 as b*, which are both within the range of from −2.5 to 2.5 and show that they are roughly colorless hues that are unbiased toward yellowish, bluish and the like, but it is evident that the Comparative Example 1 is yellowish because of the large b* of 2.82. Accordingly, when the film of Inventive Example 1 is used as the electrode for a touch panel, display hues of the display set on its lower side can be observed as the hues as such, but when the film of Comparative Example 1 is used, they are displayed having such a tinge of yellow that another color-compensation film is required in order to prevent this.

In addition, it can be seen that increase of the surface resistivity after the test of the conductive films of Inventive Examples 1 and 2 is 1.3 times or less than that before the test, even when radius of the wire to be bent along is 3 mm and even when it is 1 mm. Based on this, the conductive films of Inventive Examples 1 and 2 can keep the function as the electrode for a touch panel even when they are strongly pressed with a pen or the like because of the small increase of the surface resistivity. However, increase of surface resistivity of the ITO film of Comparative Example 1 is 1.1-folds or less of before the test when radius of the wire is 5 mm or more, but it was confirmed that increase of surface resistivity after the test becomes 3-folds or more of before the test when the radium is 3 mm and becomes 2700-folds or more of before the test when it is 1 mm, so that it was found that there is a possibility that its function on as the electrode for a touch panel cannot be kept when strongly pressed with a pen or the like because of the too large increase of surface resistivity.

INDUSTRIAL APPLICABILITY

Since the transparent conductive formed articles of the invention have a transparent conductive layer which has high transparency, little coloring and excellent abrasion resistance and elasticity, they can be desirably used in touch panels for carrying out data input into, for example, an electronic pocketbook, a portable remote information terminal, a portable game machine, a car navigation system, a personal computer, a railway ticket dispenser and the like.

The invention claimed is:

1. A transparent conductive formed article for a touch panel, wherein a transparent conductive layer comprising carbon nanotubes is formed on at least one side of a transparent substrate, wherein the estimated content of the carbon nanotubes is from 1 to 450 mg/m$^2$, the transparent conductive layer has a surface resistivity of 10$^4$ Ω/square or less, the transparent conductive layer's light transmittance at a wavelength of 550 nm is 75% or more, and both of the transmission hues a* and b* of the transparent conductive formed article in the L*a*b* color system established by JIS Z8729 are within the range of −2.5 to 2.5.

2. The transparent conductive formed article for a touch panel according to claim 1, wherein the surface resistivity of the conductive layer is increased by a factor of 1.3 or less after its bending at a curvature radius of 3 mm.

3. The transparent conductive formed article for a touch panel according to claim 1, wherein the carbon nanotubes are single-wall carbon nanotubes.

4. The transparent conductive formed article for a touch panel according to claim 1, wherein the carbon nanotubes are double or triple wall carbon nanotubes.

5. The transparent conductive formed article for a touch panel according to claim 1, wherein a dispersing agent is contained in the conductive layer.

6. The transparent conductive formed article for a touch panel according to claim 1, wherein a binder is contained in the conductive layer.

7. A touch panel comprising as an electrode the transparent conductive formed article according to claim 1.

* * * * *